(12) United States Patent
Wilson et al.

(10) Patent No.: US 7,626,578 B2
(45) Date of Patent: Dec. 1, 2009

(54) CALIBRATION OF AN INTERACTIVE DISPLAY SYSTEM

(75) Inventors: Andrew D. Wilson, Seattle, WA (US); Dawson L. Yee, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/210,041

(22) Filed: Sep. 12, 2008

(65) Prior Publication Data

US 2009/0002344 A1    Jan. 1, 2009

Related U.S. Application Data

(62) Division of application No. 10/870,779, filed on Jun. 16, 2004, now Pat. No. 7,432,917.

(51) Int. Cl.
*G06F 3/042* (2006.01)
(52) U.S. Cl. .......................... 345/175; 345/173
(58) Field of Classification Search ................ 345/156, 345/173, 175, 178, 104
See application file for complete search history.

(56) References Cited

U.S. PATENT DOCUMENTS

| 7,379,562 | B2 * | 5/2008 | Wilson | 382/103 |
| 7,411,575 | B2 * | 8/2008 | Hill et al. | 345/156 |
| 7,411,584 | B2 * | 8/2008 | Hill et al. | 345/177 |
| 2003/0111588 | A1 * | 6/2003 | Chen | 250/208.1 |
| 2004/0183787 | A1 * | 9/2004 | Geaghan et al. | 345/173 |
| 2005/0146513 | A1 * | 7/2005 | Hill et al. | 345/173 |
| 2005/0190162 | A1 * | 9/2005 | Newton | 345/175 |
| 2005/0226505 | A1 * | 10/2005 | Wilson | 382/180 |

* cited by examiner

*Primary Examiner*—Ricardo L Osorio
(74) *Attorney, Agent, or Firm*—Workman Nydegger (57) ABSTRACT

In an interactive display system, a projected image on a display surface and a vision system used to detect objects touching the display surface are aligned, and optical distortion of the vision system is compensated. Also, calibration procedures correct for a non-uniformity of infrared (IR) illumination of the display surface by IR light sources and establish a touch threshold for one or more uses so that the interactive display system correctly responds to each user touching the display surface. A movable IR camera filter enables automation of the alignment of the projected image and the image of the display surface and help in detecting problems in either the projector or vision system.

23 Claims, 9 Drawing Sheets

CALIBRATION OF AN INTERACTIVE DISPLAY SYSTEM

CROSS-REFERENCE TO RELATED APPLICATIONS

The present application is a divisional application of U.S. patent application Ser. No. 10/870,779, filed Jun. 16, 2004, entitled "Calibration of an Interactive Display System", which has issued as U.S. Pat. No. 7,432,917, and which is incorporated by reference in its entirety.

FIELD OF THE INVENTION

This invention generally relates to the optical calibration of an object sensing system used in connection with an interactive table on which images are projected, and more specifically, pertains to compensating for optical distortion produced by an infrared (IR) source and camera used for sensing objects resting on the interactive table, and to determining a touch threshold in regard to reflectance of IR from a user's fingertip that is contact with a surface of the interactive table.

BACKGROUND OF THE INVENTION

Touch responsive displays are used on personal data assistants (PDAs), tablet personal computers (PCs), and as monitors that can be coupled to PCs. However, most such displays are simply pressure activated or employ optical sensors around the periphery of the display surface. Another type of touch sensitive display has been developed in the art that uses optical vision systems for interactively detecting an object touching a display surface. Examples of these are the metaDesk developed by the MIT Media Lab, as reported by Brygg Ullmer and Hiroshi Ishii in "The metaDESK: Models and Prototypes for Tangible User Interfaces," *Proceedings of UIST* 10/1997:14-17, and a display surface as disclosed in several papers published by Jun Rekimoto of Sony Computer Science Laboratory, Inc., in collaboration with others.

An interactive display system like these that have previously been developed typically includes a projector for projecting an image on a surface, and a vision system for detecting objects on the surface. Almost no information is provided in references about these interactive display systems about aligning the projected image with the vision systems. A desired interactive experience when using an interactive display system would ensure that the system properly respond to a user touching a virtual (projected) object, such as a virtual control button appearing on the display surface. However, if the position of the virtual control button in the projected image is not properly aligned with the position of the user's finger sensed by the vision system, the interactive display system will not respond correctly. Optical errors in the vision system must be corrected to enable the vision system to provide an accurate determination of the location where an object is touching the display surface. For example, use of a wide angle lens in the vision sensing system can cause barrel distortion. If the sensor used to detect an object on the display surface is mounted off to one side of the surface, its view of the display surface will cause a trapezoidal distortion.

A further source of problems can arise if the illumination used by the vision system to detect objects on the display surface is non-uniform, since an uneven illumination can cause erratic sensing of objects on a display surface if not compensated or corrected. Many pattern recognition techniques employed by a vision system assume that an absolute pixel intensity level is detected by the vision system and will fail if the appearance of an object in the vision system is brighter or dimmer at various different positions of the object on a surface. It is important that the behavior of these type algorithms be independent of the location of an object on a surface. The vision system should also be capable to distinguish when an object is touching a display surface from when an object is simply close to the display surface. Since the skin of different users can differ in reflectivity, it may be necessary to determine a threshold level for the user of the interactive system so that false determination of each user touching the display surface is avoided.

Accordingly, in order for an interactive display system to properly respond to a user touching the display surface, the optics of the system must be aligned and calibrated, various types of distortion must be removed, and compensation must be made for variations between users. Clearly, it would be preferable to perform the calibration and alignment of the interactive system in an automated manner, before the interactive system is shipped from the factory. However, alignment of the projector and vision system can change over time or do to rough handling while the system is being shipped. Accordingly, it would be desirable to enable each interactive display system to be easily aligned after leaving the factory, either by a skilled user or a technician. It would also be desirable to adjust the threshold for user touch on the display surface in an unobtrusive way, so that the user is generally not aware that the process is being carried out.

SUMMARY OF THE INVENTION

Since each interactive display system that is manufactured to the same design should nominally perform the same, it is likely the same compensation for effects such as optical distortion that is determined for one such interactive display system can be employed for all of the others of the same design. However, there will inevitably be variations in the way that specific interactive display systems operate due to the inevitable manufacturing tolerances and differences in the environment that can produce thermal expansion changes, etc. These variations between different units of the interactive display system can result in the need for fine tuning the compensation for each such interactive display system and for calibrating the interactive display systems from time to time.

The present invention was thus developed for use in calibrating and compensating errors in an interactive display system that includes a projector for projecting images on a display surface, a light source for illuminating an object on the display surface, and a vision sensing system having an imaging sensor for receiving light reflected back from the display surface by an object in contact with the display surface. In one aspect of the invention that is directed to a method, a signal is received from the imaging sensor that varies in response to the intensity of light reflected from the object in contact with the display surface. The signal received from the imaging sensor is then automatically compensated for any error, yielding a compensated signal. Either or both the vision sensing system and the projector are then aligned relative to the other and to the display surface. This step is important so that each position in image of the display surface correctly corresponds to the same point in the image projected onto the display surface. The compensated signal is thus employed as an input to a software program that defines the images projected on the display surface, so that the software program accurately detects a location of an object on the display surface relative to the images projected on the display surface by the projector.

One error of the vision system is a barrel distortion caused by a lens on the imaging sensor. Accordingly, the step of automatically compensating comprises the step of mapping points on the display surface to corresponding points in a barrel distortion image produced by the imaging sensor. Another error can be a trapezoidal distortion caused by the imaging sensor being disposed at an off-axis location relative to the display surface. In this case, points on the display surface are mapped to corresponding points in a trapezoidal distortion image produced by the imaging sensor.

Another compensation automatically applied to the interactive display system is normalizing an intensity of the light reflected from an object in contact with the display surface to compensate for variations in the intensity of the light at the imaging sensor. These variations can be caused, for example, by the light reflected from an object following paths of differing length in reaching the imaging sensor from the light source. To determine how to normalize the intensity, the method provides that a reflective sheet is moved over substantially all of the display surface while a maximum intensity and a minimum intensity of the light reflected from the reflective sheet are automatically detected with the imaging sensor. Thereafter, a normalizing function is applied to the signal from the imaging sensor in response to light reflected from any object in contact with the display surface, and the normalizing function is based upon the maximum intensity and the minimum intensity that were detected.

In a preferred interactive display system, the light source produces infrared (IR) light. A movable IR filter is disposed between the display surface and the imaging sensor in a normal configuration. The IR filter prevents visible light from reaching the imaging sensor so that the imaging sensor responds substantially only to IR light reflected from an object on the display surface when detecting the object. When calibrating the interactive display system, the IR filter is moved out from between the display surface and the imaging sensor, placing the vision system into a calibration configuration in which the imaging sensor receives and responds to visible light from the display surface. Various images are then projected onto the display surface with the projector, and these images can be predefined patterns, e.g., a grid or set of dots, or include predefined levels for each of the color components (red, green, and blue—RGB). The interactive display system then automatically detects whether the signal from the imaging sensor for an image of the display surface corresponds to expected values and intensities of the color components, or to the predefined pattern. If not, an indication is provided that an error exists in either the projector or the vision system.

The projector can project a completely white image toward the underside of the interactive display table, to illuminate the perimeter region around the display surface. (Either the IR filter in front of the projector or the IR-pass filter in front of the imaging sensor should be removed from the light/imaging path to enable the perimeter region to be evident in the image produced by the imaging sensor.) The image of the perimeter of the display surface produced by the imaging sensor is then evaluated to determine the active user boundary of the display surface, since light reflected by the underside of the perimeter region will be evident in the image, providing an indication of the extents of the display surface as perceived by the imaging sensor (which effectively enables the imaging sensor to "crop" the image it receives to equal the active user area). Next the projector projects a plurality of location targets onto the display surface. Based on the position of the location targets in the active user area that was just determined, the interactive display table aligns the projected image produced by the projector to the active user area by shifting the image contents in the image produced by the imaging sensor so that the positions of the location targets in that image are disposed in appropriate positions relative to the active user area that was just determined. This technique aligns the imaging sensor with the projected image and with the display surface, but assumes that the imaging sensor and projector respectively image and project over areas larger than the active user area.

As a further alternative, a plurality of spaced apart reflective marks can be provided on an underside of the interactive table, outside a periphery of the display surface. The image of these reflective marks produced by the imaging sensor can then be used to determine if the imaging sensor is properly aligned with the display surface and can be used to drive an automated alignment of the imaging sensor to the display surface. However, this approach does not check or facilitate the alignment of the entire system, since it does not evaluate the alignment of the projector with the display surface and with the imaging sensor.

To produce predefined patterns, a template is preferably projected onto the display screen with the projector. Examples of appropriate templates include alignment grids, concentric circles, concentric squares, gray scale, and pure colors. The interactive display system then automatically detects whether the signal from the imaging sensor indicates that an image of the template on the display surface is substantially equal to the template. If not, the system indicates that an error exists and may indicate that the error should be reduced by making an alignment adjustment to either or both the projector and the imaging sensor. A different filter is preferably disposed between the display surface and the imaging sensor during these alignment calibrations. The different filter modifies the light from the display surface received by the imaging sensor while the template is projected onto the display surface and can be for example, a color filter or can compensate for differences in a focal point of the imaging sensor when imaging using IR light and visible light.

Another calibration step determines a touch threshold for light reflected from an appendage of a user touching the display surface, to accommodate variations in light reflectivity for different users. To determine the touch threshold, a region is preferably indicated on the display surface where the user should touch the display surface. The method then provides for determining if an increase in an intensity of points within region detected by the imaging sensor is consistent with the user touching the region. If so, the touch threshold is set equal to an intensity of light detected after the increase. Preferably, the touch threshold is refined by repetitively detecting the intensity of light reflected following a substantial increase in the intensity, each time the user is likely to have touched the region. The touch threshold is then used in software applications that respond to a user touching the display surface.

When calibrating the touch threshold, the method can determine if a shape represented by the points in the region for which the intensity increased substantially is consistent with a shape expected (i.e., the shape of a user's finger) for the user touching the region, before setting the touch threshold. It is also possible to set different touch thresholds for each of a plurality of different users of the interactive display system.

Another aspect of the present invention is directed to a memory medium storing machine executable instructions for carrying out the steps of method discussed above. Yet another aspect of the invention is directed to an interactive display system that includes a display surface on which images are displayed and on which objects are detected. A light source is provided for illuminating an object on the display surface with light. A vision sensing system is included and has an imaging sensor for sensing a object in contact with the display surface by sensing the light reflected back from the object. A projector projects images on the display surface. Also included are a processor that is coupled to the projector and the vision sensing system, and a memory storing machine instructions including a software application and procedures for calibrating and compensating said at least one error in the interactive display system, by carrying out a plurality of functions. These functions are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Computing System for Implementing Present Invention

Figure 1:
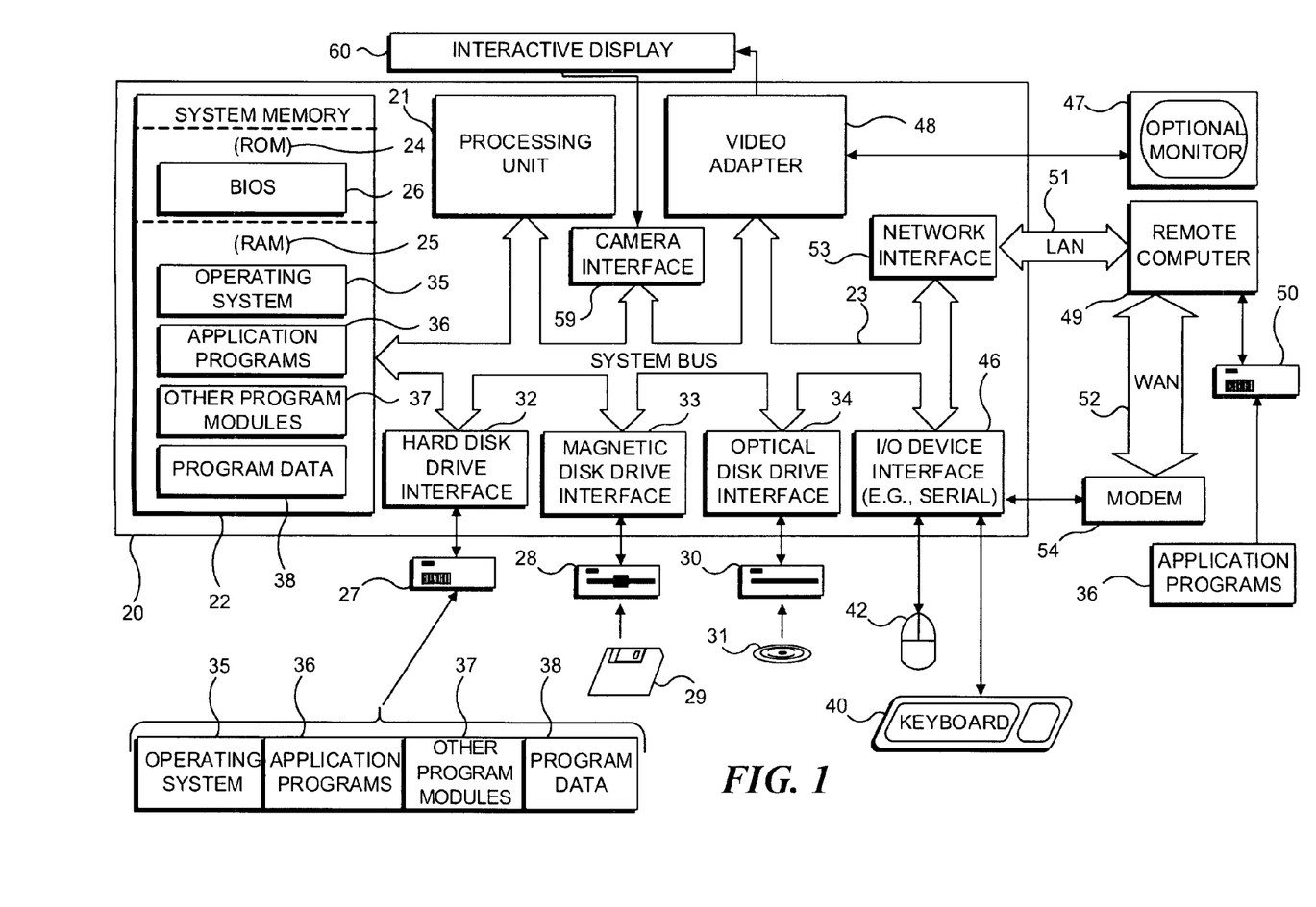
FIG. 1 is a functional block diagram of a generally conventional computing device or personal computer (PC) that is suitable for image processing for the interactive display table as used in practicing the present invention.

With reference to FIG. 1, an exemplary system suitable for implementing various portions of the present invention is shown. The system includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a compact disk-read only memory (CD-ROM) or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data and machine instructions that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information in PC 20 and provide control input through input devices, such as a keyboard 40 and a pointing device 42. Pointing device 42 may include a mouse, stylus, wireless remote control, or other pointer, but in connection with the present invention, such conventional pointing devices may be omitted, since the user can employ the interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). System bus 23 is also connected to a camera interface 59, which is coupled to an interactive display 60 to receive signals from a digital video camera that is included therein, as discussed below. The digital video camera may be instead coupled to an appropriate serial I/O port, such as to a USB version 2.0 port. Optionally, a monitor 47 can be connected to system bus 23 via an appropriate interface, such as a video adapter 48; however, the interactive display table of the present invention can provide a much richer display and interact with the user for input of information and control of software applications and is therefore preferably coupled to the video adaptor. It will be appreciated that PCs are often coupled to other peripheral output devices (not shown), such as speakers (through a sound card or other audio interface—not shown) and printers.

The present invention may be practiced using a single computing device, although PC 20 can also operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface for establishing communications over WAN 52, e.g., over the Internet. Modem 54, which may be internal or external, is connected to the system bus 23 or coupled to the bus via I/O device interface 46, i.e., through a serial port. In a networked environment, program modules, or portions thereof, used by PC 20 may be stored in the remote memory storage device. It will be appreciated that the network connections shown are exemplary, and other means of establishing a communications link between the computers may be used, such as wireless communication and wide band network links.

Exemplary Interactive Surface

Figure 2:
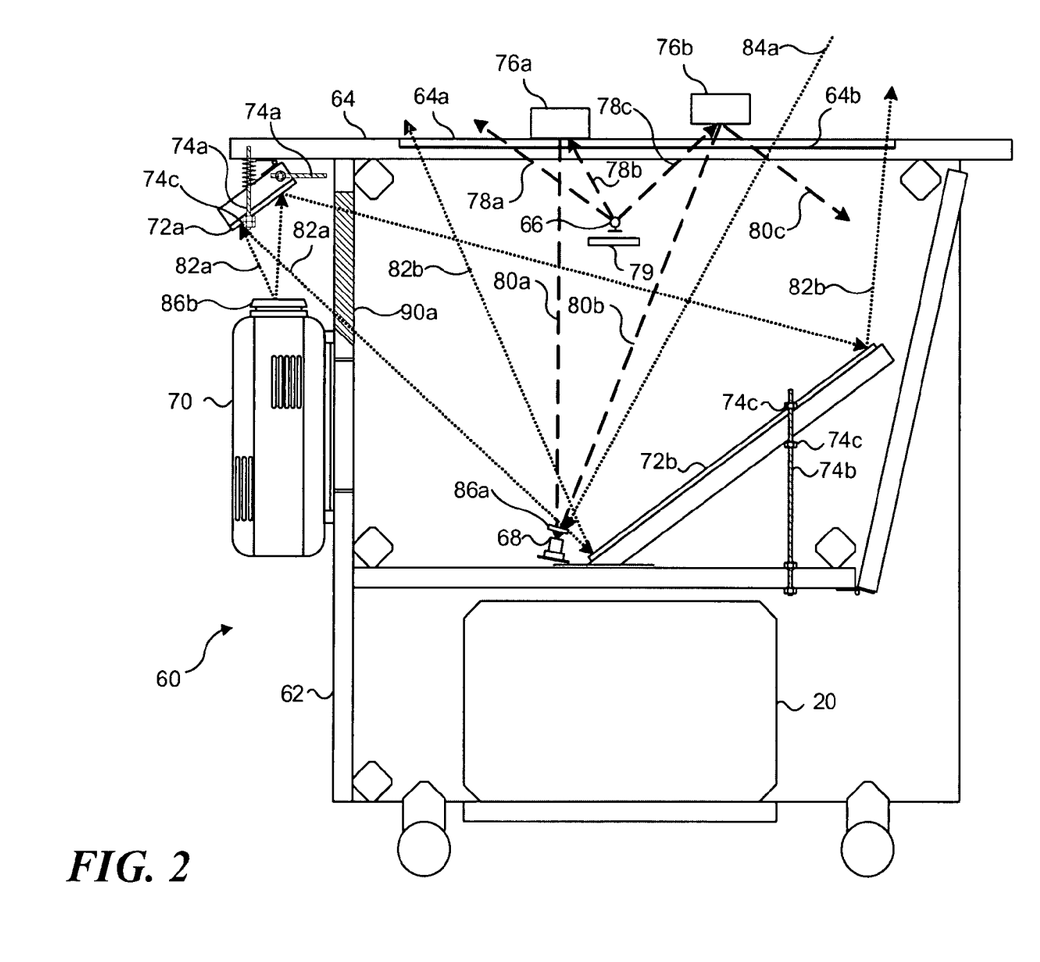
FIG. 2 is an illustration of the interior of the interactive display table showing hardware components included, and the paths followed by light within the interactive display table, and exemplary objects disposed on and above the surface of the interactive display table.

In FIG. 2, an exemplary interactive display table 60 is shown that includes PC 20 within a frame 62 and which serves as both an optical input and video display device for the computer. In this cut-away Figure of the interactive display table, rays of light used for displaying text and graphic images are generally illustrated using dotted lines, while rays of infrared (IR) light used for sensing objects on or just above a display surface 64a of the interactive display table are illustrated using dash lines. Display surface 64a is set within an upper surface 64 of the interactive display table. The perimeter of the table surface is useful for supporting a user's arms or other objects, including objects that may be used to interact with the graphic images or virtual environment being displayed on display surface 64a.

IR light sources 66 preferably comprise a plurality of IR light emitting diodes (LEDs) and are mounted on the interior side of frame 62. The IR light that is produced by IR light sources 66 is directed upwardly toward the underside of display surface 64a, as indicated by dash lines 78a, 78b, and 78c. The IR light from IR light sources 66 is reflected from any objects that are atop or proximate to the display surface after passing through a translucent layer 64b of the table, comprising a sheet of vellum or other suitable translucent material with light diffusing properties. Although only one IR source 66 is shown, it will be appreciated that a plurality of such IR sources may be mounted at spaced-apart locations around the interior sides of frame 62 to prove an even illumination of display surface 64a. The infrared light produced by the IR sources may:

exit through the table surface without illuminating any objects, as indicated by dash line 78a;

illuminate objects on the table surface, as indicated by dash line 78b; or illuminate objects a short distance above the table surface but not touching the table surface, as indicated by dash line 78c.

Objects above display surface 64a include a "touch" object 76a that rests atop the display surface and a "hover" object 76b that is close to but not in actual contact with the display surface. As a result of using translucent layer 64b under the display surface to diffuse the IR light passing through the display surface, as an object approaches the top of display surface 64a, the amount of IR light that is reflected by the object increases to a maximum level that is achieved when the object is actually in contact with the display surface.

A digital video camera 68 is mounted to frame 62 below display surface 64a in a position appropriate to receive IR light that is reflected from any touch object or hover object disposed above display surface 64a. Digital video camera 68 is equipped with an IR pass filter 86a that transmits only IR light and blocks ambient visible light traveling through display surface 64a along dotted line 84a. A baffle 79 is disposed between IR source 66 and the digital video camera to prevent IR light that is directly emitted from the IR source from entering the digital video camera, since it is preferable that this digital video camera should produce an output signal that is only responsive to the IR light reflected from objects that are a short distance above or in contact with display surface 64a and corresponds to an image of IR light reflected from objects on or above the display surface. It will be apparent that digital video camera 68 will also respond to any IR light included in the ambient light that passes through display surface 64a from above and into the interior of the interactive display (e.g., ambient IR light that also travels along the path indicated by dotted line 84a).

IR light reflected from objects on or above the table surface may be:

reflected back through translucent layer 64b, through IR pass filter 86a and into the lens of digital video camera 68, as indicated by dash lines 80a and 80b; or reflected or absorbed by other interior surfaces within the interactive display without entering the lens of digital video camera 68, as indicated by dash line 80c.

Translucent layer 64b diffuses both incident and reflected IR light. Thus, as explained above, "hover" objects that are closer to display surface 64a will reflect more IR light back to digital video camera 68 than objects of the same reflectivity that are farther away from the display surface. Digital video camera 68 senses the IR light reflected from "touch" and "hover" objects within its imaging field and produces a digital signal corresponding to images of the reflected IR light that is input to PC 20 for processing to determine a location of each such object, and optionally, the size, orientation, and shape of the object. It should be noted that a portion of an object (such as a user's forearm) may be above the table while another portion (such as the user's finger) is in contact with the display surface. In addition, an object may include an IR light reflective pattern or coded identifier (e.g., a bar code) on its bottom surface that is specific to that object or to a class of related objects of which that object is a member. Accordingly, the imaging signal from digital video camera 68 can also be used for detecting each such specific object, as well as determining its orientation, based on the IR light reflected from its reflective pattern, in accord with the present invention. The logical steps implemented to carry out this function are explained below.

Figure 3:
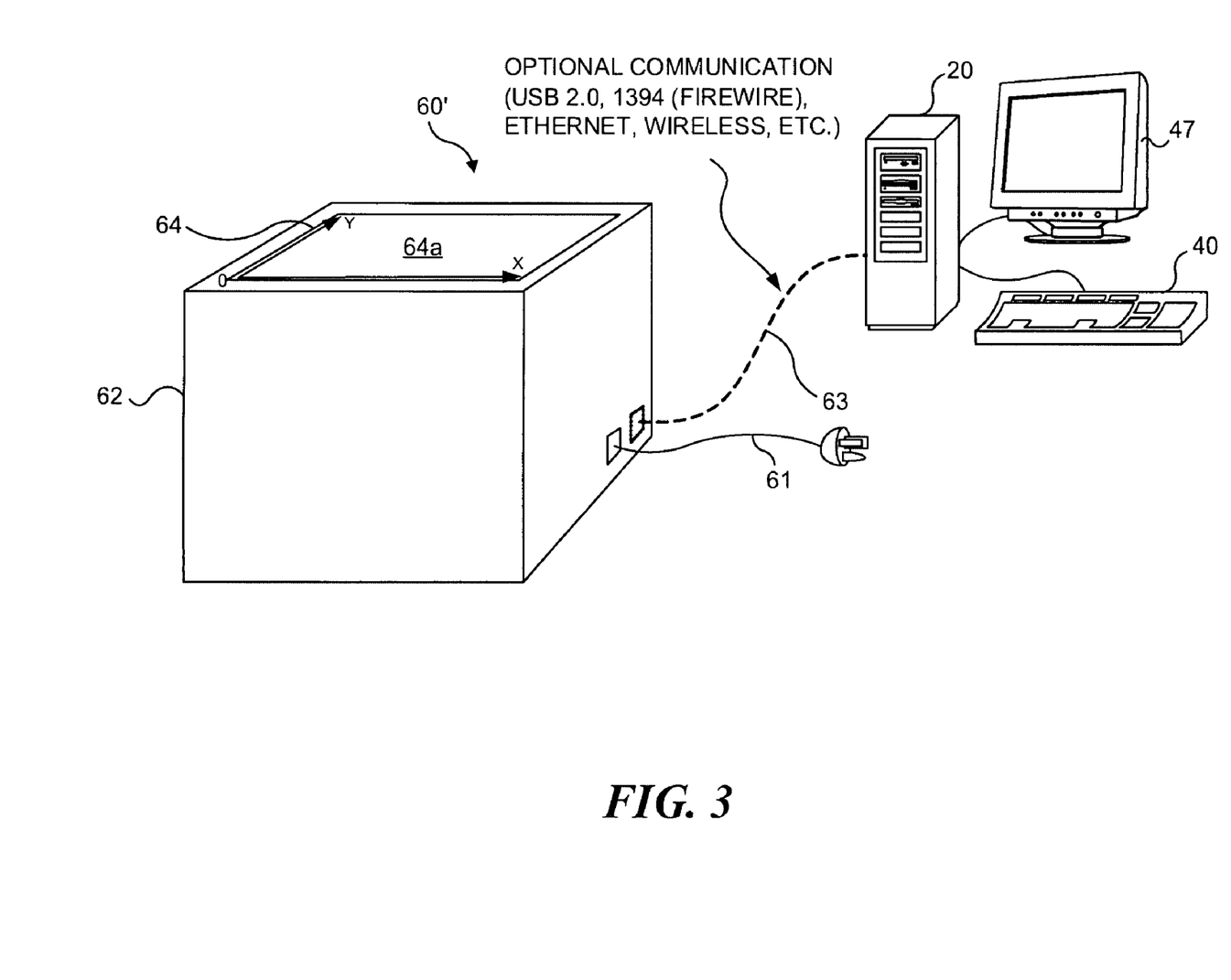
FIG. 3 is an isometric view of an interactive display table coupled to an external PC.

PC 20 may be integral to interactive display table 60 as shown in FIG. 2, or alternatively, may instead be external to the interactive display table, as shown in the embodiment of FIG. 3. In FIG. 3, an interactive display table 60' is connected through a data cable 63 to an external PC 20 (which includes optional monitor 47, as mentioned above). As also shown in this Figure, a set of orthogonal X and Y axes are associated with display surface 64a, as well as an origin indicated by "0." While not specifically shown, it will be appreciated that a plurality of coordinate locations along each orthogonal axis can be employed to indicate any location on display surface 64a.

If the interactive display table is connected to an external PC 20 (as in FIG. 3) or to some other type of external computing device, such as a set top box, video game, laptop computer, or media computer (none shown), then the interactive display table comprises an input/output device. Power for the interactive display table is provided through a power lead 61, which is coupled to a conventional alternating current (AC) line source (not shown). Data cable 63, which connects to interactive display table 60', can be coupled to a USB 2.0 port, an Institute of Electrical and Electronics Engineers (IEEE) 1394 (or Firewire) port, or an Ethernet port on PC 20. It is also contemplated that as the speed of wireless connections continues to improve, the interactive display table might also be connected to a computing device such as PC 20 via such a high speed wireless connection, or via some other appropriate wired or wireless data communication link. Whether included internally as an integral part of the interactive display, or externally, PC 20 executes algorithms for processing the digital images from digital video camera 68 and executes software applications that are designed to use the more intuitive user interface functionality of interactive display table 60 to good advantage, as well as executing other software applications that are not specifically designed to make use of such functionality, but can still make good use of the input and output capability of the interactive display table. As yet a further alternative, the interactive display can be coupled to an external computing device, but include an internal computing device for doing image processing and other tasks that would then not be done by the external PC.

An important and powerful feature of the interactive display table (i.e., of either embodiments discussed above) is its ability to display graphic images or a virtual environment for games or other software applications and to enable an interaction between the graphic image or virtual environment visible on display surface 64a and objects that are resting atop the display surface, such as a touch object 76a, or are hovering just above it, such as a hover object 76b. It is the ability of the interactive display table to visually detect such objects, as well as the user's finger or other object being moved by the user that greatly facilities this rich interaction.

Again referring to FIG. 2, interactive display table 60 includes a video projector 70 that is used to display graphic images, a virtual environment, or text information on display surface 64a. The video projector is preferably of a liquid crystal display (LCD) or digital light processor (DLP) type, or a liquid crystal on silicon (LCoS) display type, with a resolution of at least 640×480 pixels. An IR cut filter 86b is mounted in front of the projector lens of video projector 70 to prevent IR light emitted by the video projector from entering the interior of the interactive display table where the IR light might interfere with the IR light reflected from object(s) on or above display surface 64a. A first mirror assembly 72a directs projected light traveling from the projector lens along dotted path 82a through a transparent opening 90a in frame 62, so that the projected light is incident on a second mirror assembly 72b. Second mirror assembly 72b reflects the projected light along a path 82b onto translucent layer 64b, which is at the focal point of the projector lens, so that the projected image is visible and in focus on display surface 64a for viewing.

Alignment devices 74a and 74b are provided and include threaded rods and rotatable adjustment nuts 74c for adjusting the angles of the first and second mirror assemblies to ensure that the image projected onto the display surface is aligned with the display surface. In addition to directing the projected image in a desired direction, the use of these two mirror assemblies provides a longer path between projector 70 and translucent layer 64b, and more importantly, helps in achieving a desired size and shape of the interactive display table, so that the interactive display table is not too large and is sized and shaped so as to enable the user to sit comfortably next to it.

General Calibration Procedures

Figure 4:
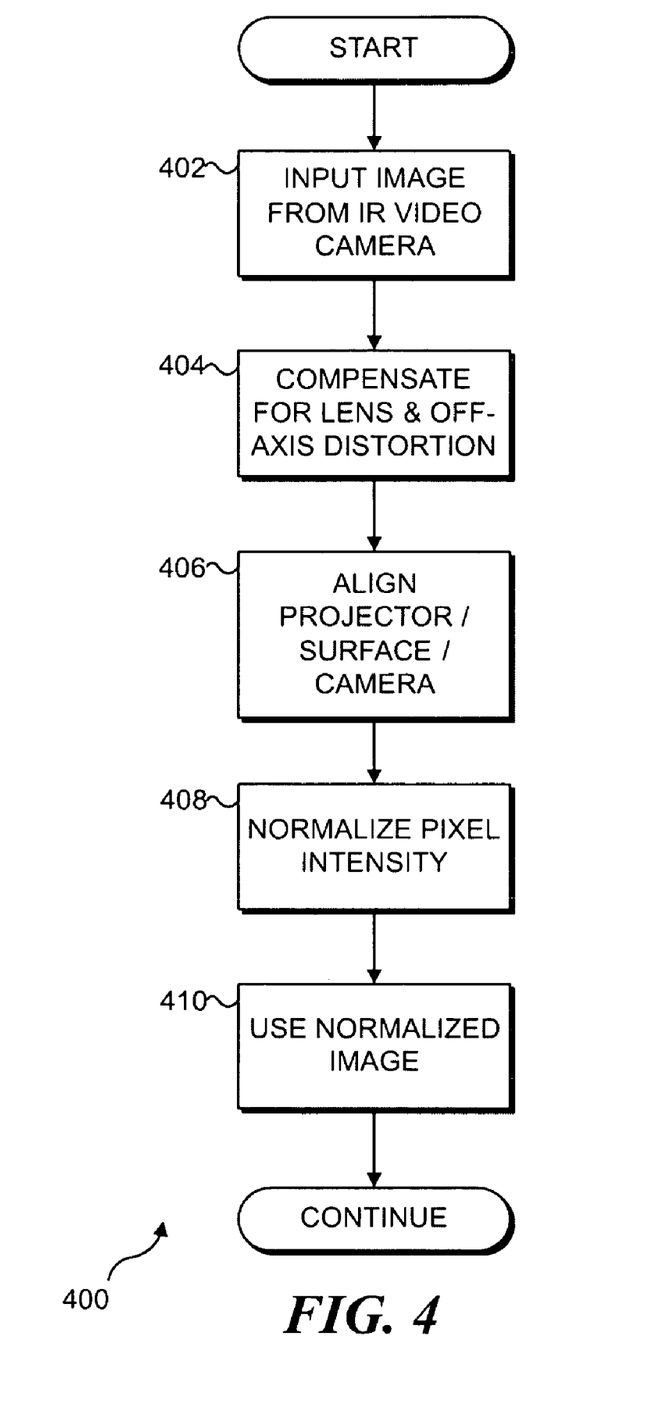
FIG. 4 is a flow chart showing the steps for calibrating/compensating the interactive table in regard to various effects of the interactive table.

FIG. 4 illustrates a flow chart 400, which shows the compensation and calibration steps employed in the present invention to transform a raw input image into a usable image. In a step 402, the video camera senses IR reflections of objects that are touching or hovering above the display surface light and produces a signal corresponding to a raw image of the display surface. This raw image is adversely affected by distortion of the video camera lens, by the off-axis position of the video camera in relationship to the display surface, and by a non-uniform IR illumination of the display surface by IR light sources 66. In addition, the alignment of projector 70 and/or of video camera 68 relative to display surface 64a may require adjustment, to ensure that objects touching the display surface are located accurately relative to images projected onto the display surface.

In a step 404, the interactive display table corrects for barrel distortion caused by the use of a wide-angle lens on video camera 68. This type of distortion causes straight lines near the periphery of the resulting image to appear to be curved outwardly. Another type of distortion that is corrected in this step is a trapezoidal distortion that arises because the video camera is not disposed on the central axis of the display surface, but is instead disposed off to one side, so that one edge of the display surface is relatively closer to the video camera than an opposite edge. This type of distortion causes the resulting image of the display surface to be shaped like a trapezoid. The interactive display table uses well-known techniques to correct for barrel distortion and trapezoidal distortion, as explained in greater detail below. Parameters for compensating both types of distortion are computed and used to map the coordinates of all points in the undistorted image that is employed for detecting objects contacting or hovering near the display surface to corresponding points in the raw image. To facilitate processing efficiency, a lookup table that maps every point in the compensated undistorted image to the corresponding point in the raw input image may be calculated offline and then used for every interactive display table of the same design, and using the same wide angle lens. In this approach, the real time image processing code computes the pixel intensity at every integral pixel location in the undistorted image and looks up where each integral pixel location maps to (floating point coordinates) in the raw image. Bilinear interpolation is then employed at that point to compute the final pixel intensity for each pixel location in the undistorted image.

A step 406 provides for testing and adjusting the alignment of the projector and video camera relative to the display surface, using the compensated image. With the barrel and trapezoidal distortions compensated, the transformation between the coordinate system used in images projected by the projector to images of the display surface by camera is linear. A template can be used to check and facilitate adjustment of the physical alignment of the projector and/or the video camera relative to the display surface, as discussed in detail below. As an alternative, a projective transform can be used to relate coordinates in the projected image to those of the compensated image that is derived from the raw output of the video camera. In fact, it may be preferable to employ a single projective transform for this function, as well as compensating for trapezoidal distortion and barrel distortion, instead of the separate mapping procedure discussed above.

In a preferred embodiment, the projected image and the image produced by the video camera have different resolutions. The parameters of this projective transform may be calculated by determining the locations of four points adjacent to the corners of the projected image relative to corresponding points in the compensated image from the video camera. The four points are determined in an interactive routine using the interactive display table. A calibration routine is initiated by the user wherein the projector displays a small spot near one corner of the table at a known location. To make this spot visible to the camera system, the user places an object visible to the system over the dot. The user uses a separate display attached to the interactive display table to view the compensated image and then designates the location of the placed object by clicking with a mouse on the location seen on the separate display. The coordinates of the object in both the projected image and compensated video camera image are thus determined. This process is repeated for the three remaining corners to determine the parameters of the projective transform. A calibrated compensated image aligned with the projected image can then be generated using projective transform and standard bilinear interpolation techniques.

In order to achieve efficient processing when using the interactive display table, a lookup table that maps every point in the undistorted calibrated and compensated image to the raw image may be calculated offline. Furthermore, the lens distortion compensation can be combined with the projective transform such that both types of compensation can be applied simultaneously, using only one lookup table.

In a step 408 the system corrects for non-uniformity of the IR illumination. It is essential that the least reflective objects placed on the display surface produce reflected IR light levels near zero and the brightest objects produce reflected IR light levels near the greatest allowable value. It is also essential that an object with a given reflectivity appears in the adjusted image with the same brightness regardless of where the object is placed on the display surface. Since the IR light sources are not equidistant from all points on the display surface and due to internal reflections within the interactive display table, the IR illumination will be not be uniform across the entire display surface. Hence, it is necessary to normalize the IR light intensities over the display surface. Details of the steps employed for normalizing are discussed below. The result of correcting for distortion, alignment, and normalizing IR intensity yields a normalized image that is then usable in software applications executed on the interactive display table, as indicated in a step 410.

Compensating Barrel and Trapezoidal Distortion

Figure 5A:
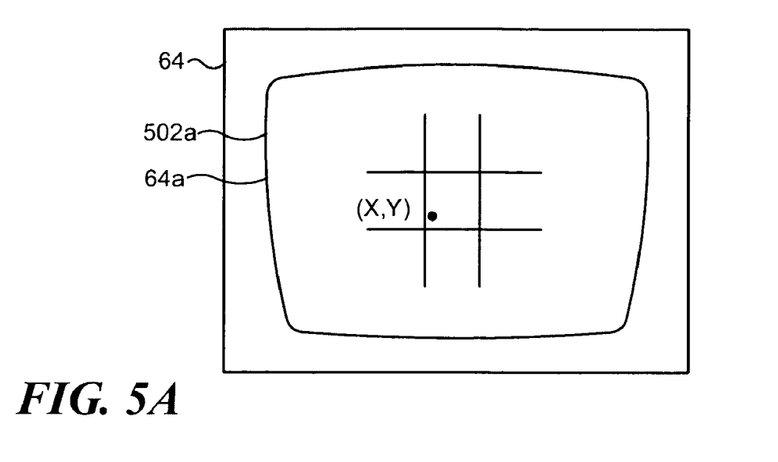
FIG. 5A, 5B, and 5C are illustrations showing the stages of compensation for distortion in the image captured by a video camera.
Figure 5B:
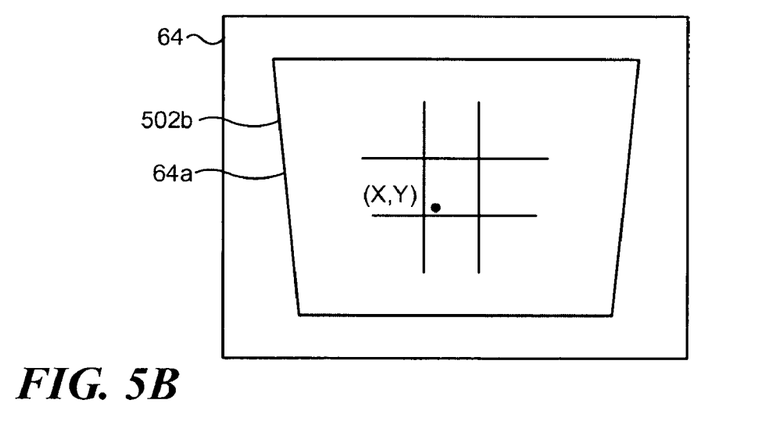
Figure 5C:
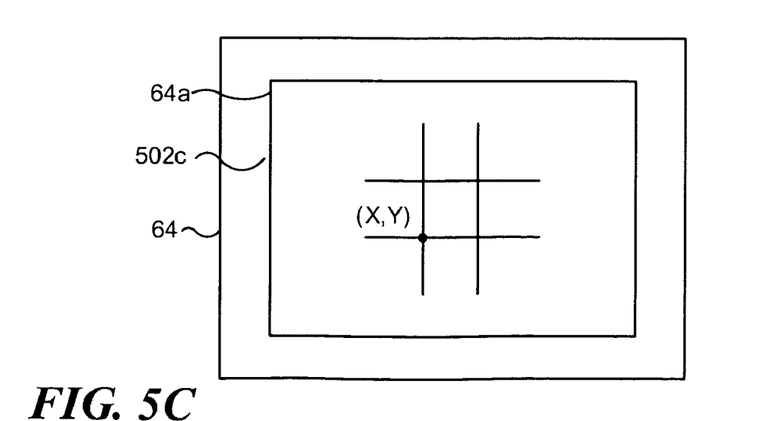

FIGS. 5A, 5B, and 5C illustrate, in a exemplary manner, the distortion and effect of compensating the distortion of the raw image discussed above in connection with FIG. 4. FIG. 5A an exemplary raw image 502a having both barrel and trapezoidal distortion. Also included are two pair of parallel lines intersecting at right angles representing a coordinate system on display surface 64a. Each point in a compensated image 502c, which is shown in FIG. 5C, is mapped to a corresponding point in raw image 502a. Although the mapping between the fully compensated image and the raw image is actually done in one step in a preferred embodiment, the compensation is illustrated in FIGS. 5A-5C as occurring in two separate steps.

In FIG. 5B, the barrel distortion of FIG. 5A has been corrected by mapping each point in FIG. 5B to a corresponding point in the raw image of FIG. 5A, leaving a trapezoidal distorted image 502b. Since coordinates in the fully compensated image 502c are at integer values, it is necessary to employ linear interpolation in mapping between the corresponding points in the two images.

In FIG. 5C, a further mapping has occurred between fully compensated image 502c and trapezoidal distorted image 502b. Again a linear interpolation is applied to map between coordinate points in the two images. After applying the compensation for barrel and trapezoidal distortion, the resulting fully compensated image is achieved. The mapping between each point in the fully compensated image and the raw image should generally be identical for all interactive display tables of the same design. Accordingly, the mapping functions used in the compensation of the raw image can be applied in each such interactive display table produced and will normally not need to be redetermined for a given interactive display table. These mapping functions will thus be included with the interactive display table processing modules used in processing the output signal from the video camera.

Automated Alignment and Testing

Figure 6A:
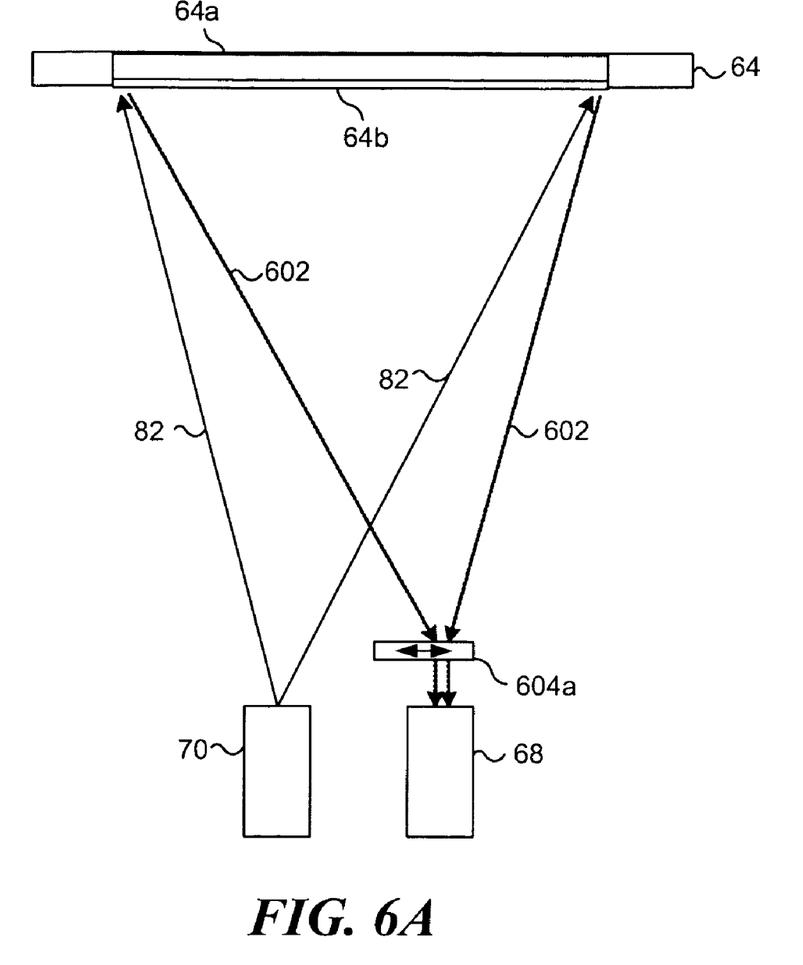
FIG. 6A is a simplified illustration of the interactive table top showing the use of a sliding filter assembly for enabling automated alignment and testing.

FIG. 6A illustrates, in an exemplary manner, an embodiment for testing and aligning the projector and/or video camera relative to the display surface. The projected image in visible light and the fully compensated image produced from the raw IR image provided by the video camera are in different wavelengths and, hence, are not directly comparable to test alignment. However, by changing the vision system used on the interactive display table from a normal configuration to a calibration configuration so that the video camera senses visible light, alignment of the projector and video camera can be tested and the results can be used for automating or facilitating the alignment process.

Figure 6B:
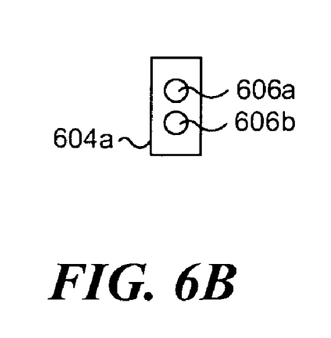
FIGS. 6B and 6C are plan views of the sliding filter assembly and an alternative rotating filter assembly.

A movable filter 604a (shown in detail in FIG. 6B) comprising multiple optical elements replaces IR pass filter 86a show in FIG. 2. The movable filter includes an IR pass filter 606a and a focal point correcting filter 606b that allows visible light to enter video camera 68 and corrects for differences of in the focal point of the lens of the video camera for IR light and visible light. In its normal configuration, IR pass filter 606a is placed in front of the lens, between display surface 64a and video camera 66. During the alignment process, movable filter 604a is moved into a calibration configuration, wherein correcting filter element 606b is slid in front of the video camera lens, enabling visible light to enter the video camera and shifting the focal point of the lens to correspond to the focal point when only IR light is allowed to enter the lens. Incident visible light 82 from projector 70 is projected onto display surface 64a. Visible light 602 from the display surface passes through the correcting filter in the calibration configuration of the movable filter. Thus, the video camera directly views the projected image on the display surface, enabling a comparison to automatically be made by the interactive display table between the projected image and the filly compensated image derived from the video camera output, facilitating automatic alignment testing, and adjusting of the alignment of one or both of the projector and the video camera relative to the display surface.

Figure 6C:
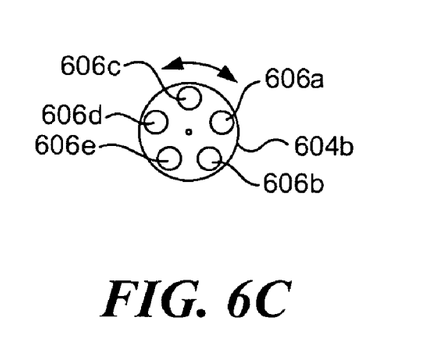

FIG. 6C illustrates a multi-element rotatable filter assembly 604b that includes IR pass filter 606a, correcting filter 606b, and different color filters 606c, 606d, and 606e (e.g., red, blue, and green), any of which can be selectively rotated to a position in front of the lens on the video camera, either manually or automatically (if the rotatable filter is driven by a motor or other prime mover—not shown), under control of PC 20 (FIG. 2). Since the rotatable filter assembly is not physically connected to the video camera, rotating it does not inadvertently bump the video camera, which might adversely affect its alignment. The color filters included in the rotatable filter assembly can be rotated to a position in front of the lens on the video camera to test its sensitivity to different colors of the visible light spectrum. Other types of filters can be included on the rotatable filter assembly for other purposes related to testing and correctly adjusting various parameters of the interactive display table.

Process for Automatic Alignment, Calibration, and Testing

Figure 7:
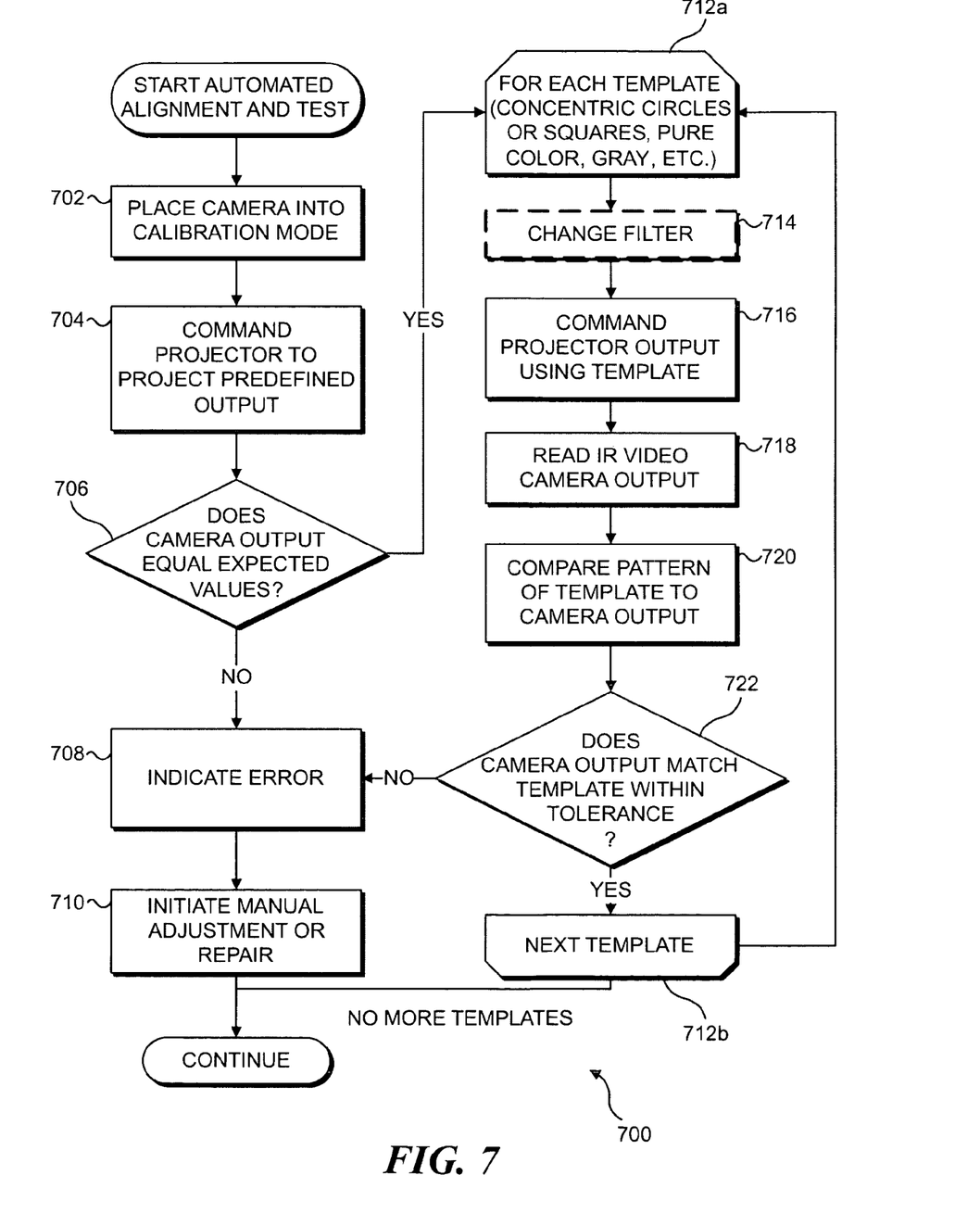
FIG. 7 is a flow chart showing a process for automated alignment and testing of the interactive table.

FIG. 7 illustrates, in an exemplary manner, an automated alignment and test process 700. In a step 702, the either prompts the user to place the video camera in a calibration mode or alternatively automatically places it in the calibration mode, i.e., by positioning the correcting filter element in front of the lens of the video camera in place of the IR pass filter.

In a step 704, PC 20 causes the projector to produce a predefined output. For example, the projector can be commanded to produce a predefined pattern or an output in which all of the red, green, and blue color components, RGB, are set equal to a predefined level, e.g., a completely black image. In a decision step 706 the system tests the video camera output to determine if it corresponds to the expected predefined output. If the camera output includes color components RGB that are not all equal to expected values (i.e., where the expected values correspond to the predefined pattern or predefined levels), then at a step 708, the system displays an applicable error message. The process then continues in a step 710 wherein manual adjustment or repair of either the projector or the video camera is initiated.

Figure 8:
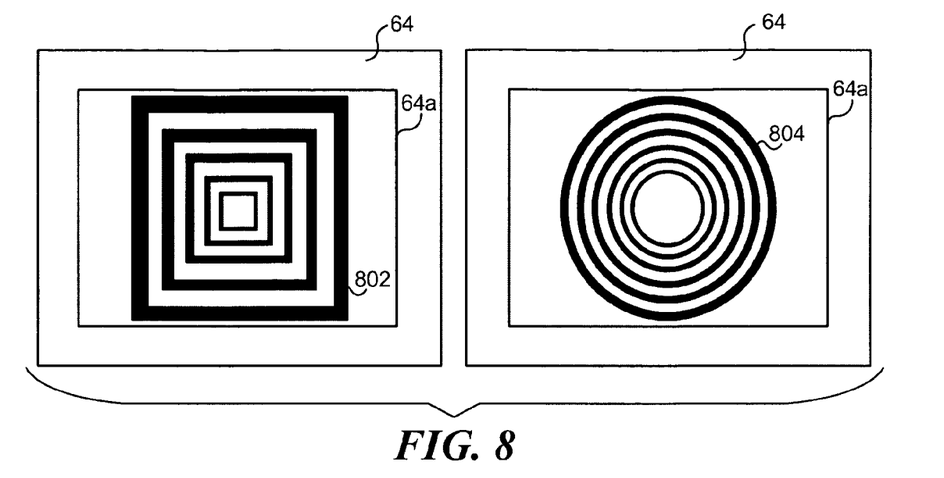
FIG. 8 illustrate the images produced using two exemplary templates employed for automated alignment and testing of the interactive table.

If the video camera output is as expected, then the process continues from decision step 706 to a step 712a, wherein the system begins to iteratively process each desired alignment/calibration/test template. These templates can include alignment grids, concentric squares and circles, gray screens, and other predefined images that are useful for testing alignment and other parameters of the interactive display table setup. FIG. 8 illustrates an exemplary concentric square image 802 and an exemplary concentric circle image 804 that are produced using two such templates.

In an optional step 714 of FIG. 7, the logic provides for either manually or automatically changing the filter positioned in front of the lens on the video camera. This step facilitates calibration and testing of the projector and the camera by using different color filters or other types of filters. Image alignment, display color saturation, hue, brightness, distortions, focus, defects, and image capture system distortions can all be determined by displaying various color and alignment templates and calculating the differences between the projected image and the image sensed by the video camera when viewed through selected filters. However, in most cases, it is likely that the only template that will be required to determine any geometric distortion of the projector and video camera is a simple grid or array of dots.

In a step 716 the system commands the projector to project the template selected in step 712a, and in a step 718, the output signal from the video camera corresponding to the image perceived by it is read by PC 20. A step 720 compares the image of the template with the image of the display surface detected by the video camera and indicated in its output signal.

A decision step 722 determines if the image indicated by the video camera output signal matches the selected template within a predetermined tolerance. If not, the process exits the iterative loop and continues at step 708 wherein the system displays an applicable error message. The process then continues in a step 710 wherein adjustment or repair is initiated. The adjustment or repair can be automated or manual. In fact, the only distortion that is likely to change after the interactive display system is shipped from the factory is the projective transform from the raw image to the display surface, and from the display surface to the projected image. The lens distortion will be fixed, assuming that the video camera is well constructed, and is completely independent of the projective transform. An automated process for adjustment or repair (in the case where the projector was reasonably well aligned) could include the step of finding alignment targets 1310 (shown in FIG. 13), which are disposed around the periphery of the display surface, on the underside of the interactive table, or as described in detail below in regard to FIG. 13, by finding location targets in the projected image with the IR filter moved out of the way (in the case where the entire transform is done through the projected image) and solving for the projective transform in exactly the same way as in the technique in which the user places an IR reflective object at various known points on the interactive display surface. This approach is desirable because it captures the entire projective transform without relying on the ability to take the IR filter out of the light path, but suffers from the fact that the ultimate accuracy is determined by how accurately the user places the IR reflective object at known points on the interactive display surface.

If manual adjustment is necessary, the user might be directed to adjust one or more alignment adjustment devices 74a-74c (see FIG. 2), which control the alignment of the image projected by projector 70 onto display surface 64a, or to reposition the video camera on its mount to align it with the projected template. Conversely, if the image indicated by the video camera output matches the image projected using the selected template within a predetermined tolerance, the process continues at a step 712b, wherein the next template (if any) is selected, until all templates have been used in the test and alignment process. When all templates have been used, the automated alignment and testing procedure concludes.

Normalizing IR Light Illumination

Since the brightest reflected IR light is typically detected for white objects placed on the display surface (e.g., white paper), it is relatively easy to determine the relative intensity of IR light illuminating all points on the display surface, so that the intensities for all points can be normalized on a per-pixel basis. Minimum and maximum IR light illumination values are determined during an interactive calibration routine that will likely be carried out for each interactive display table, at least before it leaves the factory, but which can be repeated at anytime thereafter, if necessary. Normalized pixel values I*(x,y) are computed from input pixel values I(x,y), which are indicated in the video camera signal, as follows:

$$I^*(x,y)=(I(x,y)-I\_min(x,y))/(I\_max(x,y)-I\_min(x,y))$$

where I_max(x,y) denotes the maximum intensity of IR light in the input image at a location (x,y), and I_min denotes the minimum intensity of IR light in the input image at location (x,y). When the normalization calibration routine is initiated, the interactive display table initializes I_in(x,y) to a maximum value of the IR light intensity (e.g., 255) and initializes I_max(x,y) to a minimum IR light intensity value (e.g., 0) for all points on the table.

Figure 9:
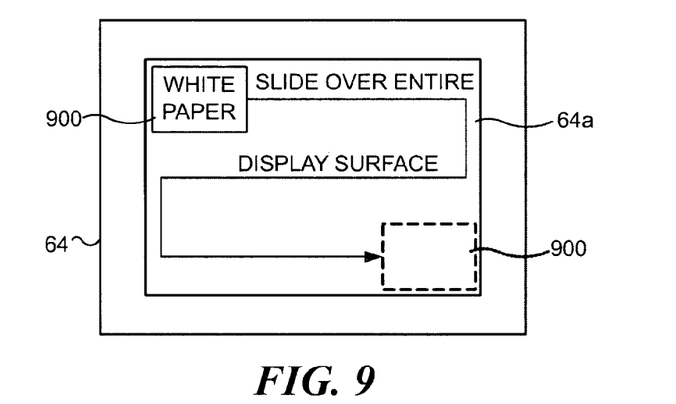
FIG. 9 illustrates use of a white reflective material such as a sheet of paper, for normalizing IR intensities over the entire display surface.

At the beginning of the calibration, it is assumed that no object has been placed on the display surface that should reflect the IR light, and the calibration process starts. During the calibration routine, each value I_min(x,y) and I_max(x,y) is compared against the input image values I(x,y), and I_min is adjusted to equal I(x,y) if I(x,y) is less than I_min(x,y), while I_max(x,y) is adjusted to equal I(x,y) if I(x,y) is greater than I_max(x,y). As shown in FIG. 9, the user then places a sheet of common white paper 900 on the display surface and moves the paper over the entire display surface such that every part of the display surface is covered by a portion of the white paper at some point during the calibration routine. Moving the white paper over the entire display surface ensures that the value I_max is updated appropriately with the maximum (brightest) value found anywhere on the display surface. At some point during this calibration, it is thus necessary for the display surface to obscured by the white paper (to collect the value I_max), and at some point not to be obscured (to collect I_min). I_min and I_max are then stored for use in the normalization of IR light intensities over all pixel locations on the display surface, using the equation noted above.

Unobtrusive Touch Threshold Calibration

The intensity I(x,y) at location (x,y) of reflected IR light from an object in the normalized image is affected by the degree to which an object on or just above the display surface reflects IR light from the IR light sources of the table and how far above the display surface the object is. If the normalized intensity of IR light reflected from an object when the object is touching the sensing surface is known, then the normalized image can be binarized to determine which pixels in the image correspond to the portion of the object that is touching the display surface. Binarization at a different threshold (i.e., the hover threshold) determines the pixels in the image corresponding to portions of the object that are near to but not touching the display surface.

The image I_touch(x,y), which correspond to the portion of an object such as a finger tip that is touching the display surface, is formed by thresholding the values of the normalized image as follows:

$$I\_touch(x,y)=I(x,y)>t\_touch$$

where t_touch is the touch threshold. Therefore, detection of a finger touch event is accomplished by finding a region of pixels in I_touch that are "on" and that (optionally) is consistent with the shape of a finger touching the display surface. This step is done by carrying out a scan of image regions on the display surface or by evaluating the output of a connected component algorithm that returns a discrete list of objects and shape information for each region of pixels meeting specific criteria.

The value of t_touch must be set properly or else the system will not detect touch events correctly. If t_touch is set too low, the system will register a touch event before a user actually touches the table. If t_touch is set too high, the system will not detect touch events reliably when the user is clearly touching the table. Because differences exist in the IR reflectivity of the skin of different users as well as the size of the fingers of the user, a value of t_touch may be precisely set to work for a given user, but may be incorrect for another user.

Therefore, setting the value of t_touch requires a calibration procedure in which the set of users who are actively using the interactive display table are test to determine the value of t_touch that is appropriate for that set of users. It is also possible to determine a possibly different value of t_touch for each user of the interactive display table, so long as the identity of the user is provided to interactive display table or it otherwise determines the specific user who will be touching the display surface.

For usability, the value of t_touch can be set without requiring an explicit calibration routine by observing the input image pixel intensity values in the natural course of table use. If this approach is taken, the value for t_touch can be determined without the user(s) even being aware that the calibration is being done. The value of t_touch may be determined by employing an application-driven expected behavior, or by requiring a touch event to start a user interaction, or from shape recognition of past touch events, or from analyzing a histogram of objects.

Figures 11, 12, 13:
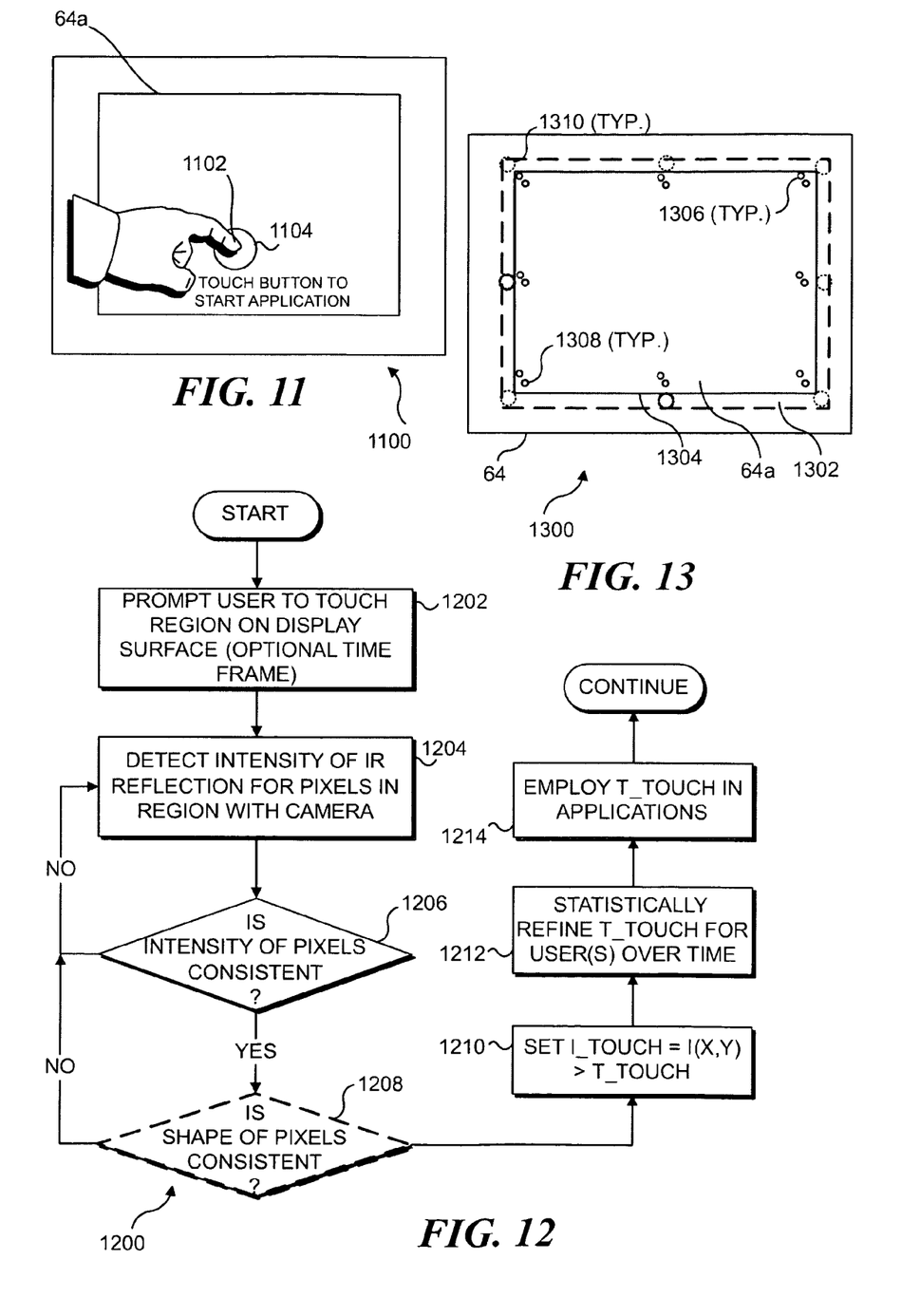
FIG. 11 is an illustration showing one example for prompting a user to touch a defined region on the display surface to determine a level of IR reflected light intensity associated with the touch of the user on the display surface.
FIG. 12 is a flow chart illustrating the logic for determining an I_touch threshold.
FIG. 13 is a plan view of the interactive display table, schematically illustrating how a projected image is used to automatically compensate for any misalignment between a projected image and the image of the display surface produced by the video camera.

As shown in an example 1100 in FIG. 11, an application-driven expected behavior can include a user touching an onscreen button 1104 with a finger 1102. If an application contains one or more onscreen buttons in a given region on the table, the calibration procedure can take the presence of any reasonable pixel intensity value within any of those regions as evidence that a user is touching the button and can adjust the value of t_touch to fit the observed pixel IR intensity values. A separate representation of the uncertainty of the current value of t_touch may govern how quickly the value is adjusted. Without the user touching a button within an expected time, the uncertainty may grow, but every time a button is pressed by a user, the uncertainty is likely to be reduced.

Requiring a touch event to start an interaction can include requiring the user to begin interaction by touching a particular region of the display surface to take the table out of a sleep state, to turn the display system, start a software application, make an initial decision, etc. Requiring the touch to be performed in a specific way that seems natural to the user can avoid false positives that might bring the table out of a sleep state inadvertently. Again, the presence of any reasonable pixel intensity value within such a region can be taken as evidence that the user is touching the display surface, enabling the system to adjust the value of t_touch to fit the observed pixel intensity values.

The system can posit a touch event, particularly in the case of touching a button region, if the shape of the touching object is consistent with past touch events in the same region. In such cases, the value of t_touch can be adjusted more aggressively.

When there are natural constraints, the system can deduce the image pixel intensity values that are consistent with touching by analyzing a histogram of objects that are likely to be used. Some applications will rely more or less on the placement of a variety of objects on the table. For example, some applications may be driven exclusively by touch, while other applications may be a mixture of touch and recognized tagged objects, while still other applications may allow or even encourage the user to place any object on the table.

Tagged objects made from white paper will appear significantly brighter than all other objects on the table, including fingers and hands, and pixel intensity values that fall within expected ranges for the set of expected objects may be discarded or included in the adjustment of t_touch, as appropriate.

For multiple users, a single value for t_touch may be sufficient in some cases, depending upon the range of variation in size of the users' fingers, and their relative reflectivity. If such is not the case, it will be necessary to maintain separate values of t_touch for each of the multiple users of the table. In such cases, representing the allowable values of t_touch in a histogram or other probability distribution that maps the average pixel intensity value over a putative touch region to the likelihood that it matches one of the users will suffice. To minimize confusion of the algorithm as a given user touches the display surface, it may be necessary to wait for the average value over the putative touch region to approach a stable value before classifying it as a touch.

Figure 10:
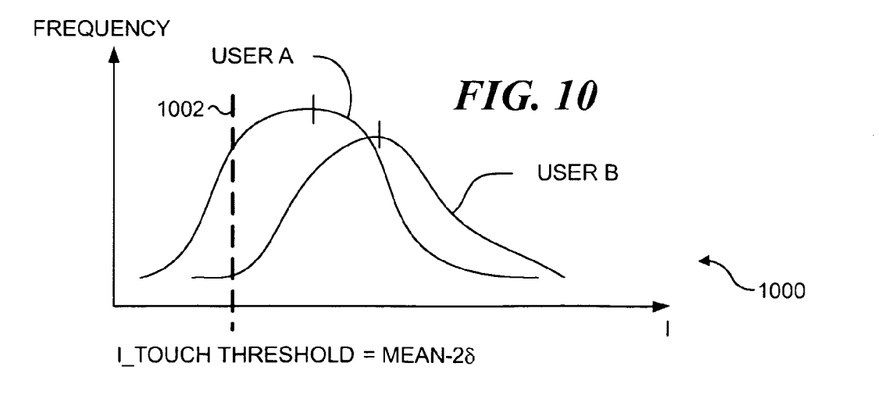
FIG. 10 is a graph showing frequency vs. reflected IR intensity for the touch of two different people, for use in refining an I_touch threshold.

FIG. 10 illustrates statistical data collected for the frequency with which the IR reflectance intensities, I, were observed for a user A and a user B, over time. If a single value of t_touch is to be used for these two users, it will typically be preferable to use a value that is less than the mean value of I for user A, for example, the mean value of I for user A minus two times the standard deviation, $6$. However, other suitable mathematical approaches can be used for refining the value of t_touch based on these statistical data.

FIG. 12 includes a flowchart 1200 that illustrates the logical steps for determining the touch threshold. A step 1202 prompts a user to touch a region (such as a control button) on the display surface. After the user is prompted, the option for determining the touch threshold may expire if a substantial increase in the brightness of IR light reflected from the region is not observed within a defined time interval. The intensity of reflected IR light from pixels in the region is observed using the video camera in a step 1204. A decision step 1206 then determines if the intensity of the pixels in the region is consistent with a user touching the region. This step can determine there has been a substantial increase in intensity of reflected light in the region, but the increase would be inconsistent with a user touch if the intensity levels is too great, which might occur if a user dropped a sheet of paper in the region. If not, the logic returns to step 1204. Otherwise, the logic proceeds to an optional decision step 1208, which determines if the shape of the pixels with an increased IR reflectance in the region are consistent with the shape of a finger tip. If not, the logic also returns to step 1204. Conversely, if the shape is consistent with the expected shape (or if the optional decision step is not employed, the logic proceeds with a step 1210, which sets I_touch equal to I(x,y)>t_touch. A step 1212 then statistically refines the value of t_touch over time, by collecting data used to determine the value, as indicated, for example, in the example of FIG. 10. The value of t_touch that is thus determined is then used in software applications that require the touch of a user to be detected by the video camera, to control the application or select among options presented on the display surface, as indicated in a step 1214.

Referring now to FIG. 13, a plan view 1300 illustrates an approach for determining the extents and disposition of the effective user area or boundary of the display surface relative to the image produced by the video camera. In this approach, while IR filter 86b is removed from in front of the projector lens (or the IR-pass filter is removed from in front of the video camera), projector 70 (FIG. 2) projects plain white light onto the underside of interactive display surface 64a, so that a peripheral region 1302, on the underside of the table top and around the display surface, is illuminated. Video camera 68 (FIG. 2) then produces an image that includes the underside of the table in which a boundary 1304 of the display surface is clearly evident and defines the extents of the display surface relative to the image produced by the video camera. Next, the projector project a plurality of location targets 1308 onto the display surface (more or less than the number shown in FIG. 13 can be used). In this Figure, location targets 1308 are shown as darker circles that are disposed offset from the sides of the display surface. The video camera images the location targets and in the example shown, the location targets appear to be displaced upwardly and slightly to the left relative to their actual position on the display surface, as represented by lighter circles 1306. By evaluating the position of the location targets in the image produced by the video camera relative to boundary 1304 of the display surface that was just determined, the interactive display table can automatically determine how to shift the contents of all subsequent images produced by the video camera to compensate for the misalignment between the projected image and the active user area of the display surface relative to the image produced by the video camera.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

We claim:

1. A method for calibrating a touch threshold for an interactive display system that responds to users touching a display surface on which images are projected by sensing light reflected from where the user touches the display surface, comprising the steps of:

prompting a user to touch a region on a display surface as part of a touch threshold setting procedure:

projecting an image onto the display surface indicating the region where the user is to touch the display surface:

after prompting the user to touch the region, detecting a likely touch of the region on the display surface by the user, based upon criteria related to an image of the display surface that indicate the user has touched the region;

detecting an intensity of reflected light for points in the image within the region where it is determined that the user likely touched the display surface; and setting the touch threshold equal to the intensity of the points within the region where it is determined that the user likely touched the display surface.

2. The method of claim 1, further comprising the step of refining the touch threshold based on statistical data determined by repeating the steps recited in claim 1 over time.

3. The method of claim 1, wherein the step of setting the threshold is only done if a change in the intensity of the points in the image within the region is consistent with the user touching the region, the change in intensity comprising one criterion.

4. The method of claim 1, wherein the step of setting the threshold is only done if a shape represented by the point in the image within the region is consistent with an expected shape, the expected shape comprising one criterion.

5. The method of claim 1, wherein a different touch threshold is determined for each of a plurality of different users of the interactive display system.

6. The method of claim 5, wherein the light that is reflected from where the user is touching the display surface is infrared (IR) light.

7. The method of claim 6, wherein the plurality of different users can have different touch thresholds because of differences between a reflectivity of skin of each different user and because of differences in a size of a touch of the users on the display surface, further comprising the step of determining which user is likely to be touching the display surface so that the touch threshold for said user is employed when detecting whether said user is touching the display surface.

8. The method of claim 1, further comprising the step of requiring the user to touch the region to initiate a desired action on the interactive display system, to determine when it is likely that the user is touching the display surface within the region.

9. A memory medium storing machine executable instructions for carrying out the steps of claim 1.

10. The method recited in claim 1, wherein the image projected onto the display surface, which indicates the region where the user is to touch the display surface, comprises a displayed button.

11. The method recited in claim 1, wherein an uncertainty value governs how frequently the touch threshold will be adjusted.

12. The method recited in claim 11, wherein the uncertainty value goes up if the user fails to touch the region within a predetermined period of time.

13. An interactive display system in which provision is made for calibrating a touch threshold, comprising:
   (a) a display surface on which images are displayed and on which objects are detected;
   (b) a light source for illuminating an object on the display surface with light;
   (c) a vision sensing system having an imaging sensor for sensing a object in contact with the display surface by sensing the light reflected back from the object;
   (d) a projector for projecting images on the display surface;
   (e) a processor coupled to the projector and the vision sensing system; and
   (f) a memory storing machine instructions for carrying out a plurality of functions, including:
      (i) detecting a likely touch of a region on the display surface by a user, following a prompting for the user to touch the region on the display surface and a display of the region on the display surface where the user is to touch, and based upon criteria related to an image of the display surface made by the imaging sensor that indicate the user has touched the region that is displayed on the display surface;
      (ii) detecting an intensity of reflected light for points in the image within the region where it is determined that the user likely touched the display surface; and
      (iii) setting the touch threshold equal to the intensity of the points within the region where it is determined that the user likely touched the display surface.

14. The interactive display system of claim 13, wherein the machine instructions further cause the processor to refine the touch threshold based on statistical data determined by repeating steps (ii) and (iii) over time.

15. The interactive display system of claim 13, wherein the machine instructions further cause the processor to use the projector to project an image onto the display surface indicating the region where the user is to touch the display surface.

16. The interactive display system of claim 13, wherein the machine instructions further cause the processor to set the threshold only if a change in the intensity of the points in the image within the region is consistent with the user touching the region, the change in intensity comprising one criterion.

17. The interactive display system of claim 13, wherein the machine instructions further cause the processor to set the threshold only if a shape represented by the point in the image within the region is consistent with an expected shape, the expected shape comprising one criterion.

18. The interactive display system of claim 13, wherein the machine instructions further cause the processor to determine a different touch threshold for each of a plurality of different users of the interactive display system.

19. The interactive display system of claim 18, wherein the light source produces infrared light so that IR light that is reflected from where the user is touching the display surface.

20. The interactive display system of claim 19, wherein the plurality of different users can have different touch thresholds because of differences between a reflectivity of skin of each different user and because of differences in a size of a touch of the users on the display surface, and wherein the machine instructions further cause the processor to determine which user is likely to be touching the display surface so that the touch threshold for said user is employed when detecting whether said user is touching the display surface.

21. The interactive display system of claim 13, wherein the machine instructions further cause the processor to require a user to touch the region to initiate a desired action on the interactive display system, to determine when it is likely that the user is touching the display surface within the region.

22. A method for calibrating a touch threshold for an interactive display system that responds to users touching a display surface on which images are projected by sensing light reflected from where the user touches the display surface, comprising the steps of:
   (a) detecting a likely touch of a region on the display surface by a user, based upon criteria related to an image of the display surface that indicate the user has touched the region;
   (b) detecting an intensity of reflected light for points in the image within the region where it is determined that the user likely touched the display surface; and
   (c) setting the touch threshold equal to the intensity of the points within the region where it is determined that the user likely touched the display surface, wherein the step of setting the threshold is only done if a change in the intensity of the points in the image within the region is consistent with the user touching the region, the change in intensity comprising one criterion.

23. A method for calibrating a touch threshold for an interactive display system that responds to users touching a display surface on which images are projected by sensing light reflected from where the user touches the display surface, comprising the steps of:
   (a) detecting a likely touch of a region on the display surface by a user, based upon criteria related to an image of the display surface that indicate the user has touched the region;
   (b) detecting an intensity of reflected light for points in the image within the region where it is determined that the user likely touched the display surface; and
   (c) setting the touch threshold equal to the intensity of the points within the region where it is determined that the user likely touched the display surface, wherein a different touch threshold is set for each of a plurality of different users of the interactive display system.

* * * * *